(12) United States Patent
Aromin et al.

(10) Patent No.: US 11,626,264 B1
(45) Date of Patent: Apr. 11, 2023

(54) CIRCUIT INTERRUPTING SAFETY DEVICE

(71) Applicant: Tower Manufacturing Corp., Providence, RI (US)

(72) Inventors: Victor V Aromin, West Warwick, RI (US); Louis J. Shatkin, Warwick, RI (US)

(73) Assignee: Tower Manufacturing Corporation, Providence, RI (US)

( * ) Notice: Subject to any disclaimer, the term of this patent is extended or adjusted under 35 U.S.C. 154(b) by 40 days.

(21) Appl. No.: 16/952,144

(22) Filed: Nov. 19, 2020

(51) Int. Cl.
| | |
|---|---|
| *H01H 50/18* | (2006.01) |
| *H01H 50/02* | (2006.01) |
| *H02H 1/00* | (2006.01) |
| *H02H 3/08* | (2006.01) |
| *H01H 50/54* | (2006.01) |

(52) U.S. Cl.
CPC .......... *H01H 50/18* (2013.01); *H01H 50/02* (2013.01); *H01H 50/54* (2013.01); *H02H 1/0007* (2013.01); *H02H 3/08* (2013.01)

(58) Field of Classification Search
CPC ........ H01H 50/18; H01H 50/02; H01H 50/54; H02H 1/0007; H02H 3/08

USPC .................................................. 361/42, 91.1
See application file for complete search history.

(56) References Cited

U.S. PATENT DOCUMENTS

| | | | |
|---|---|---|---|
| 5,517,165 | A | 5/1996 | Cook |
| 7,492,558 | B2 | 2/2009 | Germain et al. |
| 8,384,502 | B2 | 2/2013 | Gao |
| 8,587,914 | B2 | 11/2013 | Kamor et al. |
| 8,760,824 | B2 | 6/2014 | Armstrong |
| 9,450,395 | B2 | 9/2016 | Aromin et al. |
| 9,478,382 | B1 * | 10/2016 | Aromin ................... H01H 83/02 |
| 9,608,433 | B2 * | 3/2017 | Simonin .............. H02H 1/0007 |
| 10,001,526 | B2 | 6/2018 | Sales |
| 10,020,649 | B2 | 7/2018 | Du |

* cited by examiner

Primary Examiner — Dharti H Patel (57) ABSTRACT

A circuit interrupting safety device (CISD) interrupts the flow of current through a pair of lines extending between a source of power and a load. The CISD includes a column reset assembly functioning as a circuit breaker and a contact actuator, a relay circuit including a solenoid, and a fault detecting circuit packaged in a circuit assembly. The solenoid includes a solenoid pin in an extended state when the CISD is reset and a non-extended state when the CISD is tripped.

19 Claims, 9 Drawing Sheets

CIRCUIT INTERRUPTING SAFETY DEVICE

1. FIELD OF USE

The present application is directed to resettable circuit interrupting safety devices (CISD) including without limitation ground fault circuit interrupters (GFCI's), arc fault circuit interrupters (AFCI's), immersion detection circuit interrupters (IDCI's), appliance leakage circuit interrupters (AFCI's), equipment leakage circuit interrupters (ELCI's), circuit breakers, contactors, latching relays and solenoid mechanisms. More particularly, the present application is directed to circuit interrupting devices that include a circuit interrupting portion that can break electrically conductive paths between a line side and a load side of the device and between a line side and a user load. Certain embodiments of the present application are directed to circuit interrupting devices including a reset lockout portion capable of preventing the device from resetting if the circuit interrupting portion is not functioning, if an open neutral condition exists or if the device is mis-wired. Certain embodiments of the present application are directed to methods of manufacturing circuit interrupting devices to be initially in a tripped condition.

2. DESCRIPTION OF PRIOR ART (BACKGROUND)

A CISD such as a Leakage Current Detector Interrupter (LCDI) may be a type of circuit interrupting device that detects a short circuit between conducting materials (e.g., wires, shield) of a power cord.

Many electrical wiring devices have a line side, which is connectable to an electrical power supply, and a load side, which is connectable to one or more loads and at least one conductive path between the line and load sides. Electrical connections to wires supplying electrical power or wires conducting electricity to the one or more loads are at line side and load side connections. The electrical wiring device industry has witnessed an increasing call for circuit breaking devices or systems which are designed to interrupt power to various loads, such as household appliances, consumer electrical products and branch circuits. In particular, electrical codes require electrical circuits in home bathrooms and kitchens to be equipped with ground fault circuit interrupters (GFCI), for example. Available GFCI devices, such as the device described in U.S. Pat. No. 4,595,894, use an electrically activated trip mechanism to mechanically break an electrical connection between the line side and the load side. Such devices are resettable after they are tripped by, for example, the detection of a ground fault. A test button is used to test the trip mechanism and circuitry used to sense faults, and a reset button is used to reset the electrical connection between line and load sides.

Another example, a typical LCDI device comprises a housing having a three prong plug and a power cord. The power cord emanates from the housing and typically is directly connected to an electrical household device (e.g., air conditioner unit, refrigerator, and computer). The plug is used for a standard connection to an AC (Alternating Current) outlet that provides power. Thus, when the plug is connected to an electric power source (e.g., AC outlet) electrical power is provided to the device via the LCDI and the power cord connected thereto. The power cord typically comprises a hot or phase wire, a neutral wire and a ground wire each of which is insulated. All three wires are enclosed or are wrapped by a shield which is made of electrically conducting material that is typically not insulated. The shield and the wires are all enclosed in an insulating material (e.g., rubber or similar type material) thus forming the power cord. Circuitry residing within the housing detects electrical faults resulting from electrical shorts that occur between any of the wires and the shield. When an electrical fault is detected the circuitry trips the LCDI causing the LCDI to disconnect power from the power cord and the device eliminating a hazardous condition. In particular, a circuit interrupting device such as an LCDI device is designed to prevent fires by interrupting the power to the cord, if current is detected flowing from the phase, neutral or ground wires (in the cord) to the shield within the cord. This flow of current may be caused by degradation of the insulation around the wires due to arcing, fire, overheating, or physical or chemical abuse. The current flowing between any of the wires and the shield is referred to as leakage current.

The LCDI circuitry residing within the housing typically comprises, amongst other circuits, a fault detecting circuitry and a mechanism which trips the LCDI when an electrical fault is detected. The detection portion detects the existence of an electrical fault (e.g., arcing, electrical short across between damaged wires of the power cord) based on a first threshold voltage. An electrical fault is any set of circumstances that results in current flow between either the phase, neutral or ground wires of an electrical cord and the conductive shield of that cord. Once an electrical fault is detected, the tripping mechanism causes the LCDI to be disconnected from the power supply based on a second threshold voltage.

Yet, the prior at devices are generally bulk and often times difficult to manufacture due to the number and arrangement of parts. Therefore, there exists a need for an improved circuit interrupting safety device (CISD).

BRIEF SUMMARY

The foregoing and other problems are overcome, and other advantages are realized, in accordance with the presently preferred embodiments of these teachings The invention is directed towards a circuit interrupting safety device (CISD) for detecting a metal sheath current or arcing condition. The CISD includes a solenoid, having a solenoid pin. The solenoid pin has a solenoid pin head. The CISD includes a contact actuator having an actuator fin and a holding slot for holding the solenoid pin head. When the CISD is reset the solenoid pin is extended from the solenoid by the action of the contact actuator fin engaging with and held by a reset column fin. When the CISD is tripped the solenoid is momentarily energized, pulling the solenoid pin into the solenoid, thereby disengaging the actuator fin from the reset column fin and thus disconnecting source power from the load.

The CISD circuit arrangement further includes movable contact arms that are mechanically biased to keep the contacts in a normally open position. The contact arms may take the form of a contact-carrying bar mounted in a cantilever fashion by flexible supporting legs that provide the bias to a normally open position. An elongated actuating member is arranged to reciprocate adjacent the contact-carrying bar when manually energized through an appropriate push button. When pushed, the actuating member lifts the moveable contact arm ends to engage stationary contact arms thereby connecting the source of power to the load.

The invention is also directed towards a circuit interrupting safety device (CISD) for detecting a metal sheath current. The CISD includes a contact actuator having an actuator fin and a holding slot for holding the solenoid pin head. When the CISD is reset the solenoid pin is extended from the solenoid by the action of the contact actuator fin engaging with and held by a reset column fin. When the CISD is tripped the solenoid is momentarily energized, pulling the solenoid pin into the solenoid, thereby disengaging the actuator fin from the reset column fin. The CISD also includes a fireguard circuit. The fireguard circuit includes a silicon-controlled rectifier (SCR) for detecting the presence of the metal sheath current via a wire braid connector disposed between the SCR and the metal sheath. The fireguard circuit includes a diode bridge circuit for providing latching current to the SCR; and wherein upon the detection of the metal sheath current the SCR operates to energize the solenoid and moves the solenoid pin to its non-extended state and thereby disconnecting source power from the load.

The invention is also directed towards a Leakage Current Detector Interrupter (LCDI) for detecting a metal sheath current. The CISD includes a rotating contact actuator having an actuator fin and a holding slot for holding the solenoid pin head. When the CISD is reset the solenoid pin is extended from the solenoid by the action of the contact actuator fin engaging with and held by a reset column fin. When the CISD is tripped the solenoid is momentarily energized, pulling the solenoid pin into the solenoid, thereby disengaging the actuator fin from the reset column fin. The solenoid pin comprises only magnetic material. The LCDI also includes a fire shield housing disposed around the rotating contact actuator and a plurality of moveable contact arms. Each of the plurality of moveable contact arms comprises a bendable leg cutout.

BRIEF DESCRIPTION OF THE DRAWINGS

The subject matter which is regarded as the invention is particularly pointed out and distinctly claimed in the claims at the conclusion of the specification. The foregoing and other objects, features, and advantages of the invention are apparent from the following detailed description taken in conjunction with the accompanying drawings in which:

DETAILED DESCRIPTION

The following brief definition of terms shall apply throughout the application:

The term "outer" or "outside" refers to a direction away from a user, while the term "inner" or "inside" refers to a direction towards a user;

The term "comprising" means including but not limited to, and should be interpreted in the manner it is typically used in the patent context;

The phrases "in one embodiment," "according to one embodiment," and the like generally mean that the particular feature, structure, or characteristic following the phrase may be included in at least one embodiment of the present invention, and may be included in more than one embodiment of the present invention (importantly, such phrases do not necessarily refer to the same embodiment);

If the specification describes something as "exemplary" or an "example," it should be understood that refers to a non-exclusive example; and If the specification states a component or feature "may," "can," "could," "should," "preferably," "possibly," "typically," "optionally," "for example," or "might" (or other such language) be included or have a characteristic, that particular component or feature is not required to be included or to have the characteristic.

Figure 1:
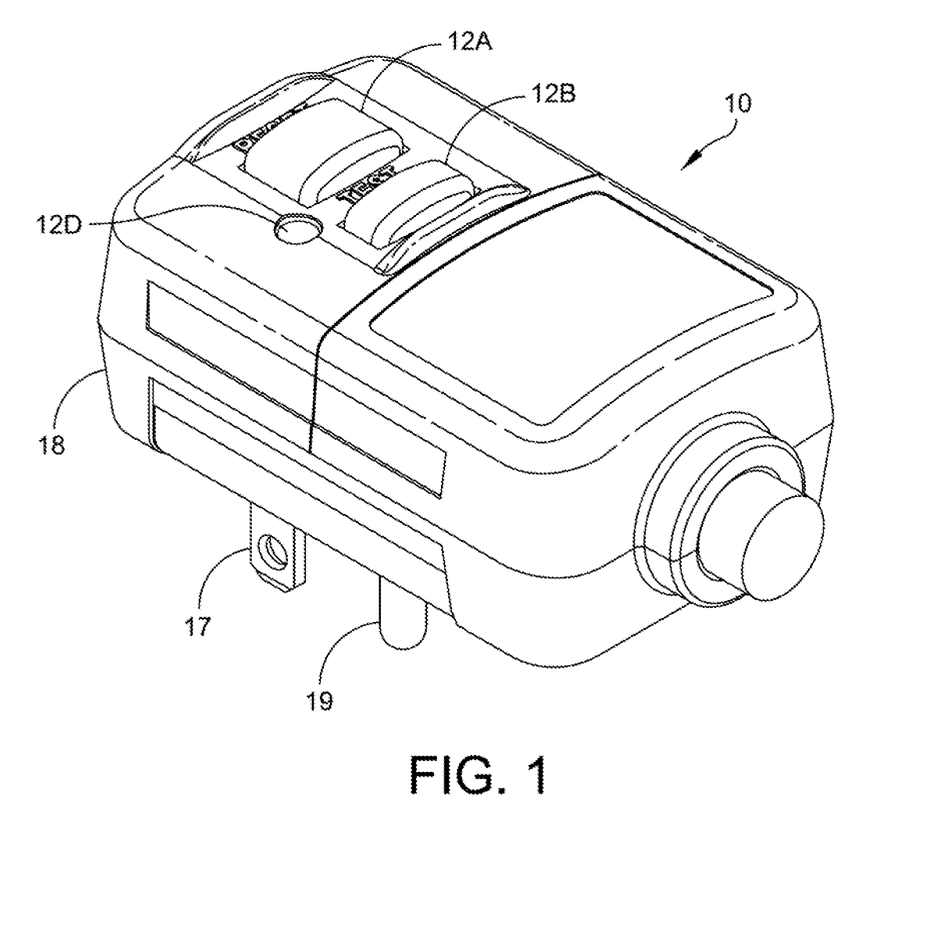
FIG. 1 is an isometric side view of the assembled CISD employing features of the subject invention shown in FIGS. 2-9.

Referring now to the drawings and more particularly to FIG. 1, there is shown an isometric side view of the assembled CISD employing features of the subject invention constructed according to the teachings of the present invention, the CISD being represented generally by reference numeral 10.

As will be discussed in detail herein, CISD 10, is a manual reset type CISD circuit, and must be manually reset to connect power from the line to the load. Upon a sensed interrupt condition, the power is interrupted between the line and load.

Still referring to FIG. 1 CISD 10 includes housing 18, boots 12A, 12B and 12D for covering reset switch, test switch, and LED indicator, respectively. As will be shown, boots 12A, 12B and 12D may be a single waterproof cover 12C. Also shown in FIG. 1 is contact blade 17, and ground pin 19. Housing 18 may be any suitable material such as high impact, Ultra Violet (UV) stabilized polyvinyl chloride (PVC). As will be described herein boots 12A, 12B, and 12D may any suitable material such as rubber or plastic and suitably mated to boot housing 18 when boots 12A, 12B, and 12D and housing 18 are assembled to provide a watertight seal. Waterproof cover 12C may be any suitable material such as a translucent or clear plastic, silicone, or rubber boot which permits visual identification of reset button 41A appearing as a different color when in the reset condition or when the CISD has been tripped or requires reset. Furthermore, CSID 10 may be assembled to meet UL 943 and NEMA 3R rating requirements.

Figure 2:
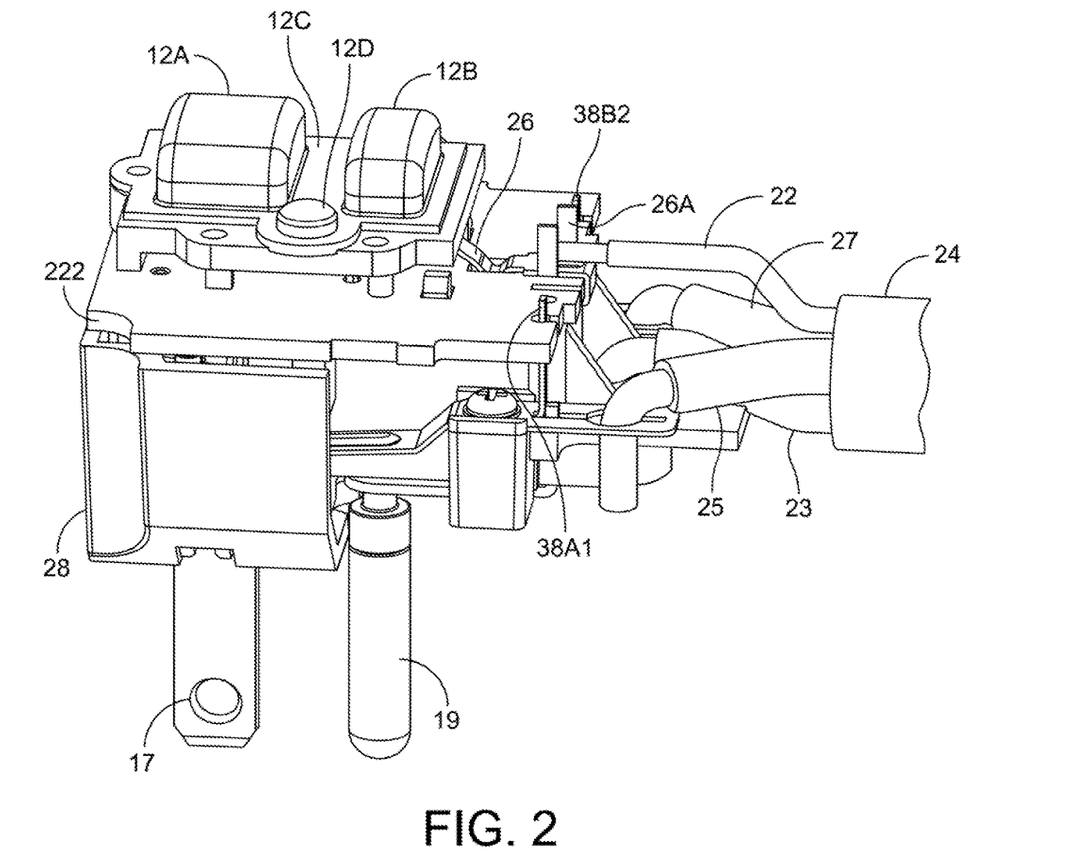
FIG. 2 is a partial isometric internal side view of the CISD employing the feature of combining the test contact arm with the solder braid terminal and the fire shield housing.

Referring also to FIG. 2 there is a partial isometric internal side view of the CISD employing the feature of combining the test contact arm with the solder braid terminal and the fire shield housing there is shown an isometric side view of the CISD employing the dual feature of incorporating the test contact arm 26 with the solder braid terminal 26A for attaching wire braid connector 22. It will be appreciated that incorporating the test contact arm (TCA) 26 function with the solder braid terminal 26A reduces the required number of components (e.g., a separate test contact arm and a separate solder braid terminal is not required).

Also shown in FIG. 2 is power cord 24. Power cord 24 includes braid connector 22, line wire 25, line wire 27, and ground wire 23. Test button 12B, when depressed operates to short test contact arm 26 to contact area (See FIG. 9) located on printed circuit board (PCB) 222. PCB 222 contains the logic and resources necessary to implement the circuits shown in FIG. 9. It will be appreciated that test contact arm 26 is shaped to provide inherent spring element to return the TCA its original position when test button 12B is released, thus obviating the need for another part (e.g., a spring).

Still referring to FIG. 2, fire shield housing 28 wraps around contactor area (discussed herein) to contain heat damage if occurs. Fire shield housing may be any suitable fire-retardant plastic.

Figure 3:
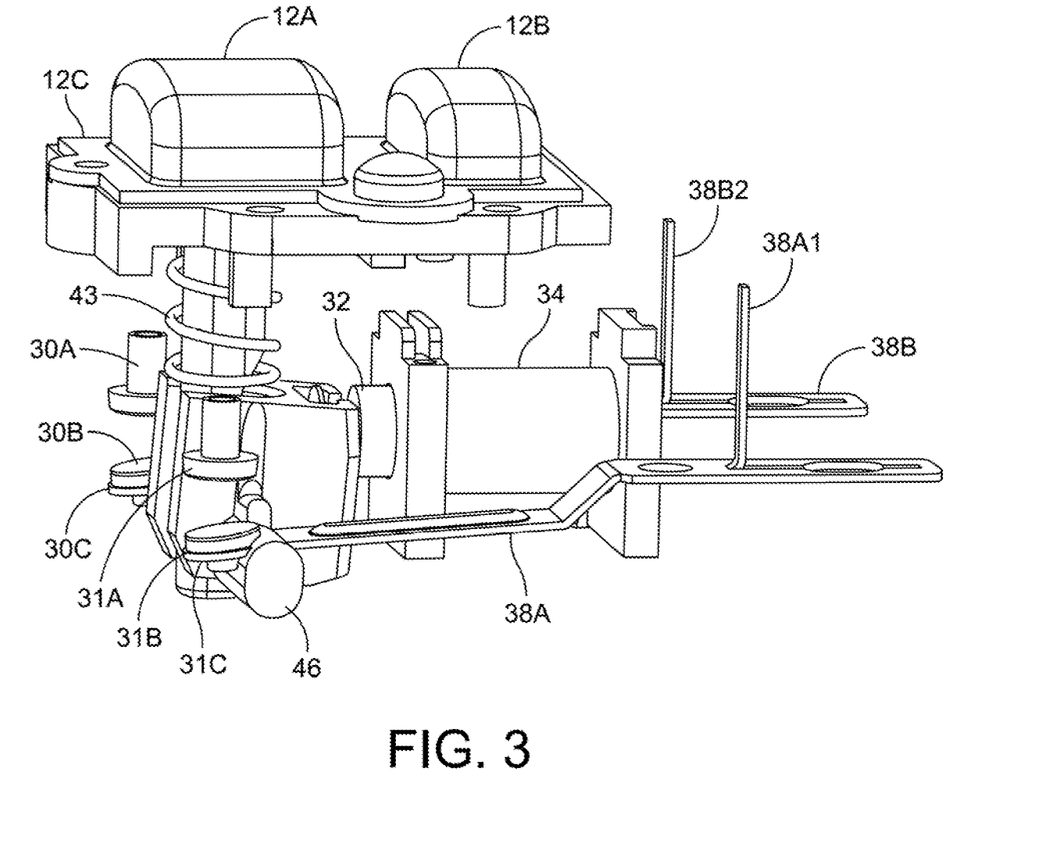
FIG. 3 is a partial internal isometric side partial view of the CISD employing features of the present invention.

Referring also to FIG. 3 there is shown a partial internal isometric side view of the CISD employing features of the present invention. Shown in FIG. 3 is solenoid 34, reset spring 33, moveable contact arm 38A with moveable contact rivet 31B, moveable contact arm 38BA with moveable contact rivet 30B. Moveable contact rivets 30B and 31B mate with stationary contact rivets 30A and 31A, respectively, when actuator 46 is in the latched position, discussed in more detail herein.

Still referring to FIG. 3 it will be appreciated that moveable contact rivets 30B and 31B are attached to moveable contact arm ends 30C and 31C, respectively, by any suitable means. As shown in FIG. 7B contact arm ends 30C and 31C are held in place by contact arm slots 7132 and 7B1, respectively. It will be appreciated that contact arms 38B and 38A also comprise bendable leg cutouts 38B2 and 38A1 which are bent into the up position as shown in FIG. 3. It will be further appreciated bendable legs 38B2 and 38A1 provide support to PCB board 222 shown in FIG. 2 obviating the need for separate construction of separate PCB board supports.

Figure 4:
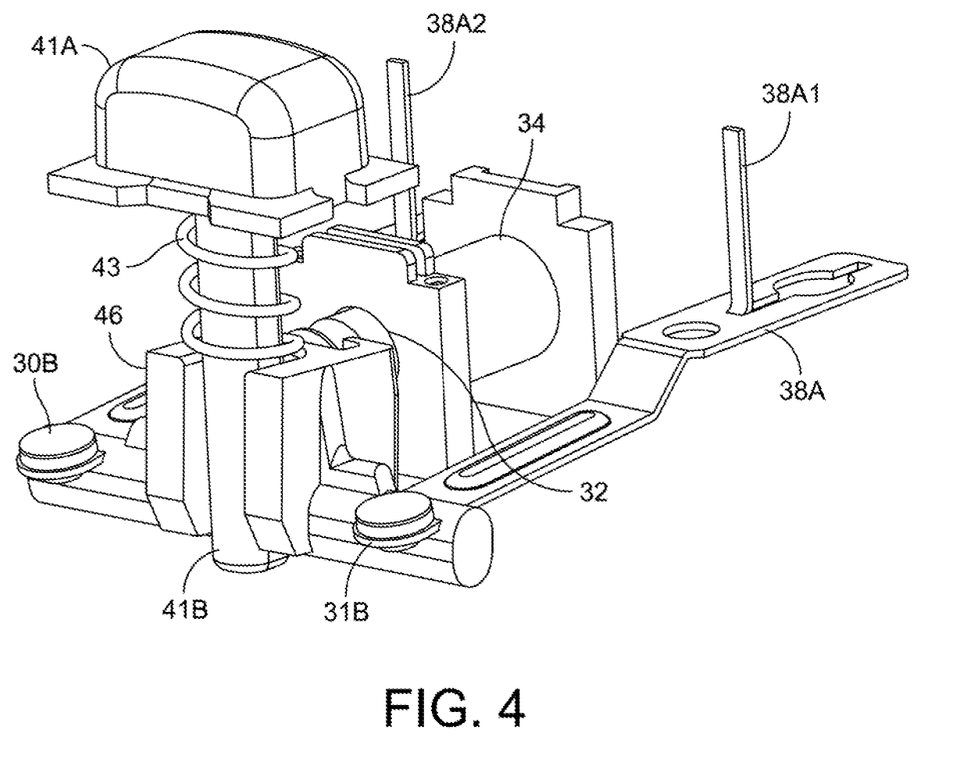
FIG. 4 is a partial internal isometric front view of the CISD reset column switch and solenoid employing features of the present invention.

Referring also to FIG. 4, there is shown reset button assembly 40. Reset button assembly 40 includes reset column 41B and reset push pad 41A. As will be described in more detail herein, when reset button 40 is depressed downwards, compressing spring 43, solenoid 34 is reset to a spring-loaded condition by contact actuator 46. When the reset column 41b is released, compressed spring 31 returns to its original position which in turn causes reset column 41B to engage contact actuator 46, which in turn causes moveable contact rivets 30B and 31B to mate with stationary contact rivets 30A and 31A, respectively, thereby completing the circuit from power lines L1, 1L2 to load lines L1, L2, respectively (see FIG. 9). It will be appreciated that prior art solutions require an extra part (latch) to secure a contact carrier to a latched or on position. In the present invention the latch (see FIG. 7A-41A,41B,41C) is integrated with the contact carrier (see FIG. 4-46).

Figure 7A:
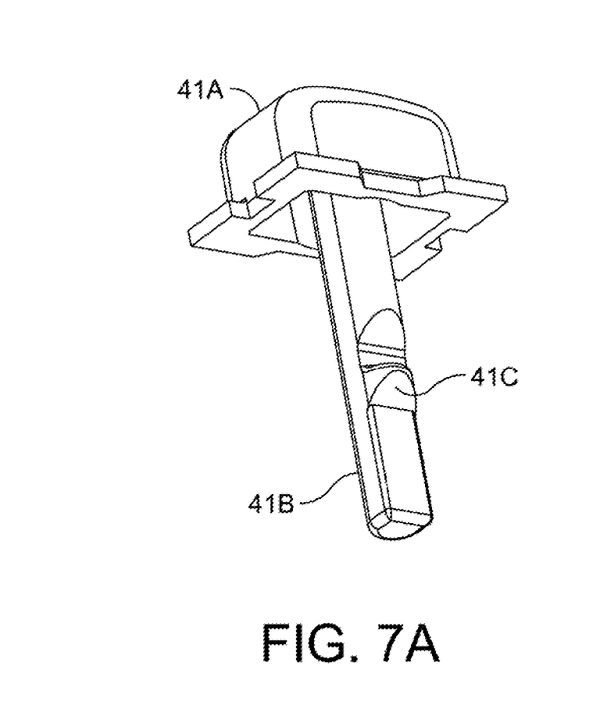
FIG. 7A is a pictorial view of the CISD reset column switch employing features of the present invention shown in FIG. 4.
Figure 7B:
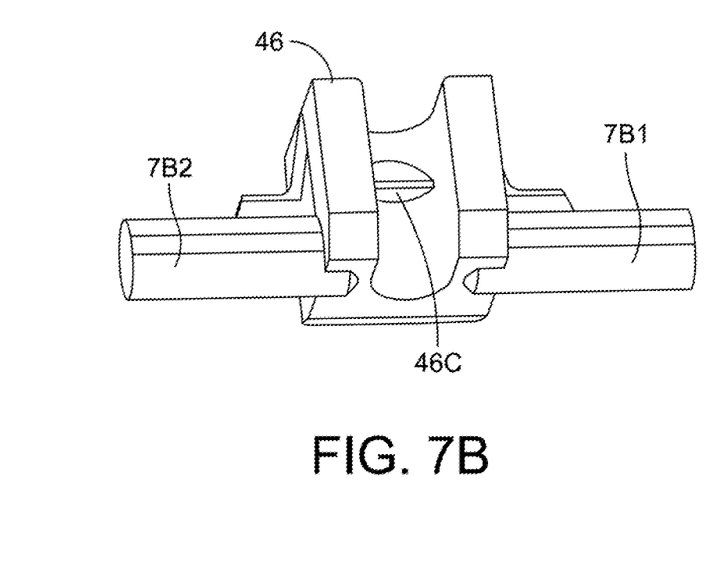
FIG. 7B is a pictorial view of the contact actuator employing features of the present invention shown in FIG. 4.

Referring still to FIG. 4 and also FIGS. 7A and 7B there is shown an internal isometric side partial view of the CISD reset button 40 and solenoid 34 employing features of the present invention. As reset button 40 is depressed downwards and released engagement fin 41C operates to engage actuator fin 46C which lifts contact actuator 46, which in turn causes moveable contact rivets 30B and 31B to mate with stationary contact rivets 30A and 31A as described herein. It will be appreciated that moveable contact arms 38A and 38B are biased towards an open position as a result of their leaf-spring-type configuration when contact actuator 46, which causes moveable contact rivets 30B and 31B to mate with stationary contact rivets 30A and 31A as described herein.

Figure 5:
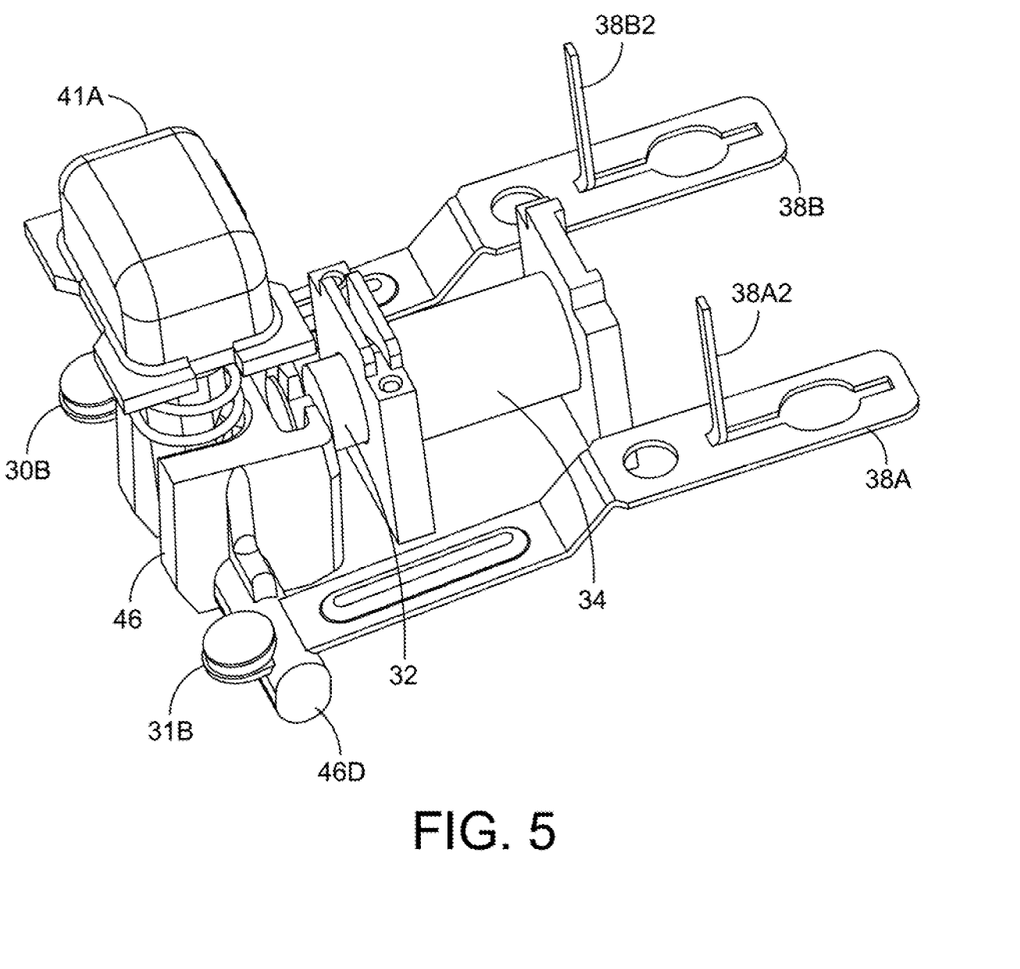
FIG. 5 is an internal isometric top partial view of the CISD reset column switch and solenoid employing features of the present invention shown in FIG. 4.
Figure 6A:
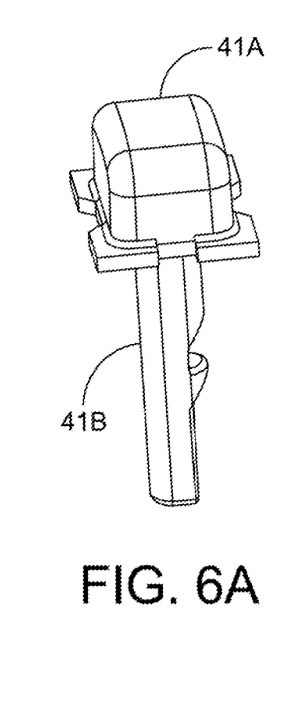
FIG. 6A-6D is an exploded side view of the CISD reset column switch, contact actuator, solenoid plunger, and solenoid, respectively, employing features of the present invention shown in FIG. 4.
Figure 6B:
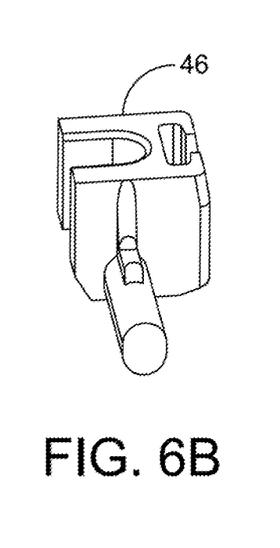
Figure 6C:
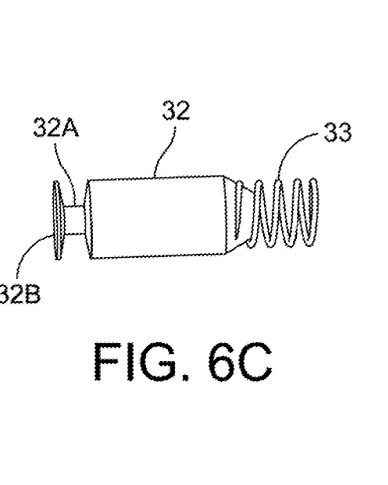
Figure 6D:
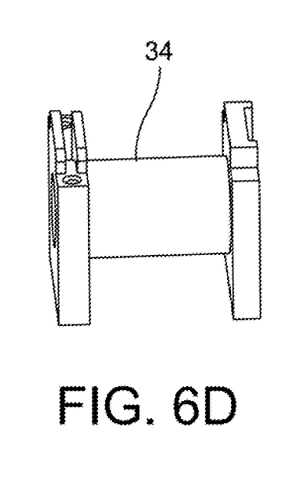
Figure 8:
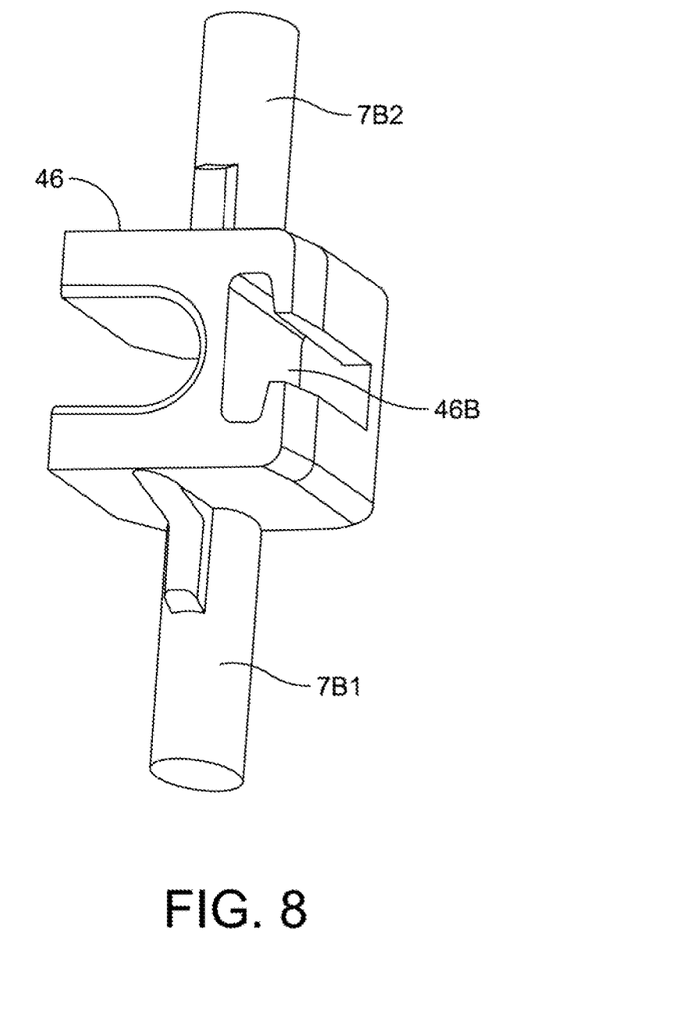
FIG. 8 is top pictorial view of the contact actuator shown in FIG. 7B.

Referring also to FIG. 5 and FIG. 8. As contact actuator 46 is engaged as described earlier, which in turn causes moveable contact rivets 30B and 31B to mate with stationary contact rivets 30A and 31A, solenoid pin 32 is pulled out of solenoid 34. It will be appreciated that prior art solutions employ a push solenoid action while the present invention employs a pull solenoid action to disengage the circuit in the case of a detected fault. It will be further appreciated that the prior art push type plunger or solenoid pin has two components: non-magnetic material (plunger) and a magnetic slug. The present invention pull-solenoid discloses a uniform magnetic pin 35 comprising only magnetic material; which is less labor to install than the prior art solutions and therefore less expensive to manufacture the CISD.

Still referring to FIG. 5 and FIGS. 6A-6D, and FIG. 8. Solenoid pin 32 includes retaining ring groove 32A and solenoid pin head 32B. Contact actuator 46 includes holding slot 46B. It will be appreciated that slot 46B holds solenoid pin 32 by engaging and holding solenoid pin head 32B within slot 46B.

Still referring to FIG. 4 and also to FIG. 2 again, PCB 222 contains the logic and resources necessary to determine if a circuit interruption should occur. As will be described herein, if PCB 222 logic and resources determine a circuit interruption should occur, i.e, the CISD is tripped, solenoid 34 is momentarily activated to draw solenoid pin 32 into solenoid 34. It will be understood that solenoid spring 33 in line with the solenoid pin 32 provides a mechanical bias quick disconnect operating in cooperation with the electromagnetic bias provided by solenoid 34. It will be appreciated that the combination of the mechanical bias provided by solenoid spring 33 with the electromechanical bias described herein urges a quicker disconnect of moveable contact rivets 30B and 31B from stationary contact rivets 30A and 31A than an electromagnetic field alone.

Referring again to FIG. 7A if PCB 222 logic and resources determine a circuit interruption should occur solenoid 34 is momentarily activated to draw solenoid pin 32 into solenoid 34 thus rotating actuator fin 46C away from engagement fin 41C. The restoring force provided by compressed spring 43 operates to push down on actuator 46 thus disengaging moveable contact rivets 30B and 31B from stationary contact rivets 30A and 31A as described herein. It will also be appreciated that restoring force provided by compressed spring 43 operates in cooperation with the inherent spring tension provided by moveable contact arms 38A and 38B biased towards an open position, thus providing faster and redundant disengagement of the contacts.

Figure 9:
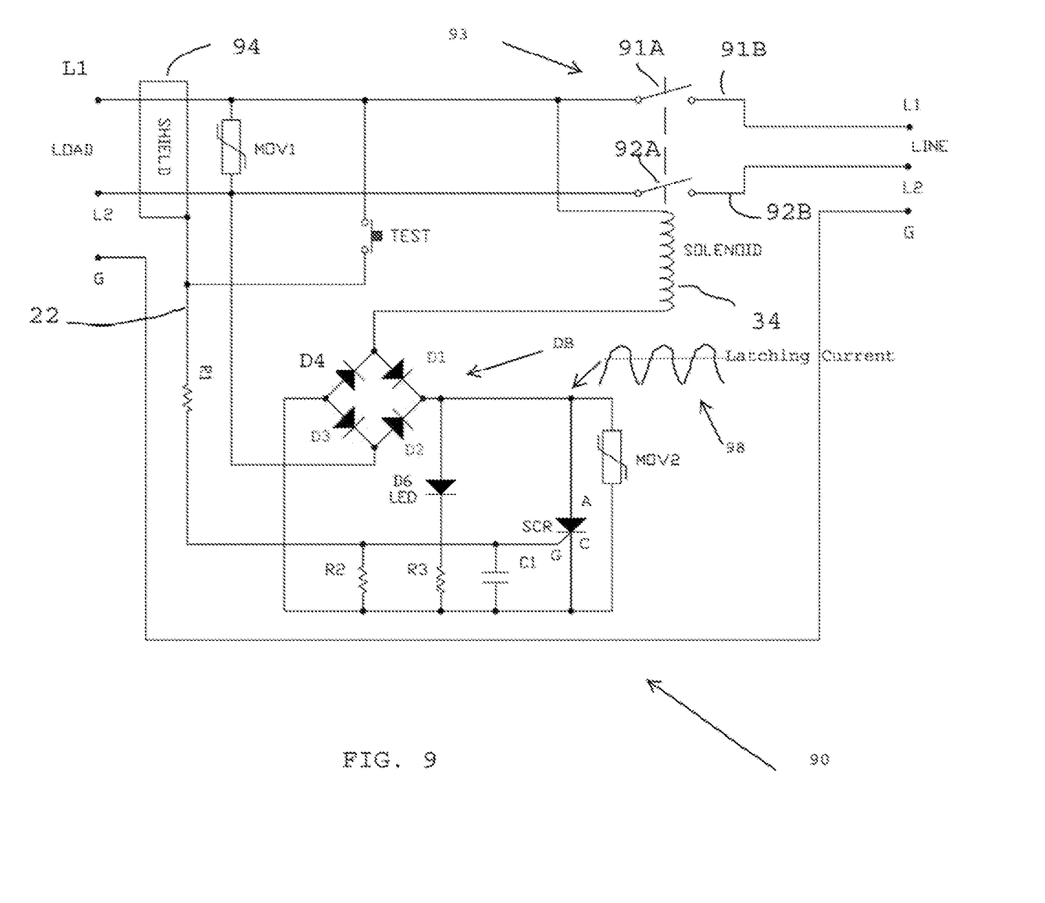
FIG. 9 is a schematic circuit diagram of an embodiment of a fireguard circuit constructed according to the teachings of the present invention.

Referring also to FIG. 9 there is shown a schematic circuit diagram of an embodiment of a fireguard circuit constructed according to the teachings of the present invention. Referring now to FIG. 9, there is shown a first embodiment of a fireguard circuit constructed according to the teachings of the present invention, the fireguard circuit being represented generally by reference numeral 90. Fireguard circuit 90 is designed principally for use as a safety device for a power cable 21 (See FIG. 2) which connects a power source (i.e., a line) to a load, said power cable including a power line L and a neutral line N. Each of the power and neutral lines L and N is wrapped with a metal sheath 94 or other similar type of shielded wrapping. The metal sheaths of the power and neutral lines L and N are, in turn, twisted together so as to effectively form a single metal sheath 94 which surrounds power line L and neutral line N.

As will be discussed in detail below, fireguard circuit 90 interrupts the flow of current through power line L L1 and neutral line N L2 extending between the power source and the load when an arcing condition occurs either between power line L and metal sheath 94 or between neutral line N and metal sheath 94. As can be appreciated, the presence of an arcing condition either between power line L and metal sheath or shield 94; or, between neutral line N and metal sheath 94 in an ungrounded neutral condition, can result in a fire or other dangerous condition, which is highly undesirable.

Fireguard circuit 90 (which is also referred to herein as safety circuit 90) comprises a circuit breaker 93 which selectively opens and closes power line L and neutral line N. Circuit breaker 93 includes a first normally-closed switch 91A which is located in power line L between the power source and the load. Circuit breaker 13 also includes a second normally-closed switch 92A which is located in neutral line N between the power source and the load. Switches 91A and 92A can be positioned in either of two connective positions. Specifically, switches 91A and 92A can be positioned in either a first, or closed, position or a second, or open, position. With switches 91A and 92A disposed in their closed position, which is the opposite position as illustrated in FIG. 9, current is able to flow from the power source to the load. With switches 91A and 92A disposed in their open position, which is illustrated in FIG. 9, current is unable to flow from the power source to the load.

Solenoid 34 is ganged to the circuit breaker contacts of switches 91A and 92A and is responsible for selectively controlling the connective position of switches 91A and 92A. Specifically, when solenoid 34 is de-energized, switches 91A and 92A remain in their closed positions when reset button 40 is depressed as discussed earlier. However, when solenoid 34 is energized, solenoid 34 rotates contact actuator 46 and switches 91A and 92A into their open positions also discussed earlier. It will be understood that switches 91A and 92A shown in fireguard circuit 90 correspond to the moveable contact arm 38A with moveable contact rivet 31B, moveable contact arm 381A with moveable contact rivet 30B and stationary contact rivets 30A and 31A discussed earlier.

Still referring to FIG. 9, a silicon-controlled rectifier SCR acts to detect the presence of an arcing condition between the power line L and the metal sheath 94 and to switch solenoid SOL from its de-energized state to its energized state upon detecting the presence of the arcing condition between the power line L and the metal sheath 94. First silicon-controlled rectifier SCR includes an anode A, cathode C, and gate G.

SCR gate G is connected to voltage divider network R1 and R2 which is connected to metal sheath 94 via wire braid connector 22. Accordingly, the presence of an arcing condition between either power line L and metal sheath 94 or neutral line N and metal sheath 94 creates a voltage drop across resistor R2 and appearing on SCR gate G. The gate voltage triggers rectifier SCR to an on status. In other words, SCR begins to conduct which, in turn, energizes solenoid 34. Once energized, solenoid 34 opens switches 91A and 92A as discussed earlier.

A capacitor C1 serves to filter out high frequency noise from passing onto the gate connection of rectifier SCR. Metal-oxide varistors MOV1 and MOV2 protects against voltage surges.

It will be appreciated that fireguard circuit 90 includes full wave rectifying bridge DB comprising diodes D1, D2, D3, and D4. It will be further appreciated that full wave rectifying bridge DB provides a pulsating DC signal 98 on the anode of the SCR. The advantage of pulsating DC signal 98 is that the latching current threshold necessary to turn SCR on, or fire the SCR, if gate voltage on SCR gate is positive may be reached during positive or negative cycles of an input alternating current (AC) power. It will be appreciated that the holding current inherently associated with the SCR is not important since the power is removed from the diode bridge and the SCR anode A when the SCR is fired.

The section headings used herein are provided for consistency with the suggestions under 37 C.F.R. 1.77 or to otherwise provide organizational cues. These headings shall not limit or characterize the invention(s) set out in any claims that may issue from this disclosure. Further, a description of a technology in the "Background" is not to be construed as an admission that certain technology is prior art to any invention(s) in this disclosure. Neither is the "Summary" to be considered as a limiting characterization of the invention(s) set forth in issued claims. Furthermore, any reference in this disclosure to "invention" in the singular should not be used to argue that there is only a single point of novelty in this disclosure. Multiple inventions may be set forth according to the limitations of the multiple claims issuing from this disclosure, and such claims accordingly define the invention(s), and their equivalents, that are protected thereby. In all instances, the scope of the claims shall be considered on their own merits in light of this disclosure, but should not be constrained by the headings set forth herein.

Finally, it will be understood that use of broader terms such as comprises, includes, and having should be understood to provide support for narrower terms such as consisting of, consisting essentially of, and comprised substantially of. Use of the term "optionally," "may," "might," "possibly," and the like with respect to any element of an embodiment means that the element is not required, or alternatively, the element is required, both alternatives being within the scope of the embodiment(s). Also, references to examples are merely provided for illustrative purposes, and are not intended to be exclusive.

The invention claimed is:

1. A circuit interrupting safety device (CISD) for detecting a metal sheath current, the CISD comprising:
   a solenoid, wherein the solenoid comprises:
      a solenoid pin comprising:
         a solenoid pin head;
         wherein the solenoid pin comprises an extended state when the CISD is reset and a non-extended state when the CISD is tripped;
   a contact actuator, wherein the contact actuator comprises:
      an actuator fin; and
      a holding slot for holding the solenoid pin head.

2. The CISD as in claim 1, further comprising a solenoid spring inline with the solenoid pin for urging the solenoid pin to its non-extended state when the CISD is tripped.

3. The CISD as in claim 1 further comprising a plurality of moveable contact arms.

4. The CISD as in claim 1 wherein the contact actuator comprises a plurality of contact arm slots, each of the plurality of the contact arm slots adapted to hold one of the plurality of moveable contact arms.

5. The CISD as in claim 3 wherein each of the plurality of moveable contact arms comprises a bendable leg cutout.

6. The CISD as in claim 1, wherein the solenoid pin comprises only magnetic material.

7. The CISD as in claim 1 further comprising a reset button assembly, wherein the reset button assembly comprises:
- a reset column, wherein the reset column comprises:
  - an engagement fin;
  - a reset push-pad; and
- wherein the engagement fin is adapted to engage the actuator fin when the reset push-pad is depressed and released resetting the solenoid pin to its extended state.

8. The CISD as in claim 7 wherein the reset button assembly further comprises a compressing spring disposed between the reset push pad and the contact actuator.

9. The CISD as in claim 1 further comprising a fire shield housing disposed around the contact actuator.

10. The CISD as in claim 1 further comprising:
- a fireguard circuit comprising:
  - a silicon-controlled rectifier (SCR) for detecting the presence of the metal sheath current;
  - a wire braid connector disposed between the SCR and the metal sheath;
  - a diode bridge circuit for providing latching current to the SCR; and
  - wherein upon the detection of the metal sheath current the SCR operates to energize the solenoid and moves the solenoid pin to its non-extended state.

11. A circuit interrupting safety device (CISD) for detecting a metal sheath current, the CISD comprising:
- a solenoid, wherein the solenoid comprises:
  - a solenoid pin comprising:
    - a solenoid pin head;
  - wherein the solenoid pin comprises an extended state when the CISD is reset and a non-extended state when the CISD is tripped and wherein the solenoid pin comprises only magnetic material;
- a contact actuator, wherein the contact actuator comprises:
  - an actuator fin;
  - a holding slot for holding the solenoid pin head;
- a fireguard circuit comprising:
  - a silicon-controlled rectifier (SCR) for detecting the presence of the metal sheath current;
  - a wire braid connector disposed between the SCR and the metal sheath;
  - a diode bridge circuit for providing latching current to the SCR; and
  - wherein upon the detection of the metal sheath current the SCR operates to energize the solenoid and moves the solenoid pin to its non-extended state.

12. The CISD as in claim 11 further comprising a solenoid spring inline with the solenoid pin for urging the solenoid pin to its non-extended state when the CISD is tripped.

13. The CISD as in claim 11 further comprising a plurality of moveable contact arms.

14. The CISD as in claim 13 where in each of the plurality of moveable contact arms comprises a bendable leg cutout.

15. The CISD as in claim 11 wherein the contact actuator comprises a plurality of contact arm slots, each of the plurality of the contact arm slots adapted to hold one of the plurality of moveable contact arms.

16. The CISD as in claim 11 further comprising a reset button assembly, wherein the reset button assembly comprises:
- a reset column, wherein the reset column comprises:
  - an engagement fin;
- a reset push-pad;
- a compressing spring disposed between the reset push pad and the contact actuator; and
- wherein the engagement fin is adapted to engage the actuator fin when the reset push-pad is depressed and released resetting the solenoid pin to its extended state.

17. The CISD as in claim 11 further comprising a fire shield housing disposed around the contact actuator.

18. A Leakage Current Detector Interrupter (LCDI) for detecting a metal sheath current, the LCDI comprising:
- a solenoid, wherein the solenoid comprises:
  - a solenoid pin comprising:
    - a solenoid pin head;
    - a solenoid spring inline with the solenoid pin for urging the solenoid pin to its non-extended state when the CISD is tripped,
  - wherein the solenoid pin comprises an extended state when the CISD is reset and a non-extended state when the CISD is tripped and wherein the solenoid pin comprises only magnetic material;
- a rotating contact actuator, wherein the rotating contact actuator comprises:
  - an actuator fin;
  - a holding slot for holding the solenoid pin head;
- a fire shield housing disposed around the rotating contact actuator; and
- a plurality of moveable contact arms, wherein each of the plurality of moveable contact arms comprises a bendable leg cutout.

19. The LCDI as in claim 18 a fireguard circuit comprising:
- a silicon-controlled rectifier (SCR) for detecting the presence of the metal sheath current;
- a wire braid connector disposed between the SCR and the metal sheath;
- a diode bridge circuit for providing latching current to the SCR; and
- wherein upon the detection of the metal sheath current the SCR operates to energize the solenoid and moves the solenoid pin to its non-extended state.

* * * * *